US007922886B2

(12) United States Patent
Fouillet et al.

(10) Patent No.: US 7,922,886 B2
(45) Date of Patent: Apr. 12, 2011

(54) DROP DISPENSER DEVICE

(75) Inventors: Yves Fouillet, Voreppe (FR); Dorothee Jary, Sassenage (FR)

(73) Assignee: Commissariat a l'Energie Atomique, Paris (FR)

( * ) Notice: Subject to any disclaimer, the term of this patent is extended or adjusted under 35 U.S.C. 154(b) by 890 days.

(21) Appl. No.: 11/722,637

(22) PCT Filed: Dec. 22, 2005

(86) PCT No.: PCT/FR2005/051131
§ 371 (c)(1), (2), (4) Date: Jun. 22, 2007

(87) PCT Pub. No.: WO2006/070162
PCT Pub. Date: Jul. 6, 2006

(65) Prior Publication Data

US 2008/0142376 A1 Jun. 19, 2008

(30) Foreign Application Priority Data

Dec. 23, 2004 (FR) .................................... 04 53211

(51) Int. Cl.
*G01N 27/453* (2006.01)
*G01N 27/447* (2006.01)

(52) U.S. Cl. ....................................... 204/450; 204/600

(58) Field of Classification Search .................. 204/450, 204/600
See application file for complete search history.

(56) References Cited

U.S. PATENT DOCUMENTS

| | | | |
|---|---|---|---|
| 4,596,575 | A | 6/1986 | Rosenberg et al. |
| 6,790,011 | B1 | 9/2004 | Le Pesant et al. |
| 7,052,244 | B2 | 5/2006 | Fouillet et al. |
| 2003/0012483 | A1 | 1/2003 | Ticknor et al. |
| 2004/0007377 | A1 | 1/2004 | Fouillet et al. |
| 2004/0055536 | A1 | 3/2004 | Kolar et al. |
| 2004/0058450 | A1 | 3/2004 | Pamula et al. |

FOREIGN PATENT DOCUMENTS

| | | | |
|---|---|---|---|
| EP | 1 439 064 | A1 | 7/2004 |
| FR | 2 548 431 | A1 | 1/1986 |
| FR | 2 794 039 | | 12/2000 |
| FR | 2 841 063 | | 12/2003 |
| WO | WO 2004/058333 | A1 | 7/2004 |

OTHER PUBLICATIONS

M. G. Pollack, et al., "Electrowetting-based actuation of droplets for integrated microfluidics", Lab Chip, vol. 2, 2002, pp. 96-101.
Vijay Srinivasan et al., "An integrated digital microfluidic lab-on-a-chip for clinical diagnostics on human physiological fluids", Miniaturisation for Chemistry, Biology & Bioengineering, May 26, 2004, vol. 4, pp. 310-315.
Japanese Office Action issued on Jan. 18, 2011 in 2007-547602 (with English Translation).

*Primary Examiner* — Alex Noguerola
(74) *Attorney, Agent, or Firm* — Oblon, Spivak, McClelland, Maier & Neustadt, L.L.P.

(57) ABSTRACT

A liquid dispensing device includes first and second substrates, with the first substrate including an opening for introduction of a fluid, and the second substrate including a multiplicity of electrodes. The device includes a transfer electrode, located at least partially opposite to the opening, at least two drop-forming electrodes, and a reservoir electrode, located between the transfer electrode and the drop-forming electrodes, and with an area that is at least equal to three times the area of each drop-forming electrode.

23 Claims, 7 Drawing Sheets

DROP DISPENSER DEVICE

This application is a 371 of PCT/FR2005/051131 filed on Dec. 22, 2005, which claims foreign priority from French application 0453211, filed on Dec. 23, 2004.

TECHNICAL AREA AND PRIOR ART

The invention concerns a device and a process for the formation of drops or of small volumes of liquid, from a liquid reservoir, using electrostatic forces.

In particular, the invention concerns a liquid dispensing device that can be applied in discrete microfluidics, or drop microfluidics, with a view to chemical or biological applications for example.

The invention applies to the formation of drops in devices, with a view to biochemical, chemical or biological analyses, whether in the medical area, in environmental surveillance, or in the area of quality control.

One of the most frequently used methods of fluid movement or manipulation is based upon the principle of electrowetting on a dielectric, as described in the article by M. G. Pollack, A. D. Shendorov, and R. B. Fair, entitled "Electrowetting-based actuation of droplets for integrated microfluidics", Lab Chip Feb. 1, 2002, pages 96-101.

The forces used for fluid movement are electrostatic forces.

Document FR 2 841 063 describes a device using a catenary that is placed opposite to activated electrodes for the movement of a fluid.

The principle of this type of movement is summarised in FIGS. 1A-1C.

A drop 2 rests upon a network 4 of electrodes, from which it is isolated by a dielectric layer 6 and a hydrophobic layer 8 (FIG. 1A), all of which rests upon a substrate 9.

Each electrode is connected to a common electrode via a switch, or rather by an individual electric-relay control system 11.

Initially, all the electrodes and the counter-electrode are placed at a reference potential V0.

When the electrode 4-1 located in the vicinity of the drop 2 is activated (set to a potential V1 that is different from V0 by operation of the relay 11), the dielectric layer 6 and the hydrophobic layer 8 between this activated electrode and the drop, polarised by the counter-electrode 10, act as a capacitance, and the electrostatic charge effects induce the movement of the drop on the activated electrode. The counter-electrode 10 can be either a catenary as described in FR-2 841 063, or a buried wire, or a planar electrode on an enclosure in the case of a contained system.

The forces of electrostatic origin are superimposed on the wetting forces, which causes spreading of the drop on the surface. The surface is then said to be rendered hydrophilic.

The drop can thus be progressively moved along (FIG. 1C), on the hydrophobic surface 8, by successive activation of the electrodes 4-1, 4-2, etc. and along the catenary 10.

The documents mentioned above give examples of the use of a series of adjacent electrodes for the manipulation of a drop in a plane.

There exist two implementation families of this type of device.

In a first case, the drops rest on the surface of a substrate that includes the matrix of electrodes, as illustrated in FIG. 1A and as described in document FR 2 841 063.

A second implementation family consists of containing the drop between two substrates, as explained, for example, in the document by M. G. POLLAK et al, already mentioned above.

In the first case, we speak of an open system, and in the second case we speak of a contained system.

In general, the system is composed of a chip and a control system.

The chips include electrodes, as described above.

The electrical control system includes a set of relays and an automatic control system or a computer that can be used to program the switching relays.

The chip is connected electrically to the control system, and so each relay can be used to control one or more electrodes.

By means of the relays, all the electrodes can be set to a particular potential V0 or V1.

In order to move a drop over a line of electrodes, it is necessary only to connect all the electrodes to relays, and to operate these in succession as described in FIGS. 1A-1C.

On this principle, it is possible to form drops from a reservoir R (FIG. 2A) by means of a line of electrodes E1-E4 which is connected to this reservoir.

Activation of this series of electrodes E1-E4 leads to the spreading of a drop, and therefore to a liquid segment 20 as illustrated in FIG. 2B.

Next, the liquid segment obtained is divided by deactivating one of the activated electrodes (electrode Ec in FIG. 2C). The result is a drop 22, as illustrated in FIG. 2D.

This process can be implemented by inserting electrodes between the reservoir R and one or more electrodes Ec (FIG. 2C) called the division electrode.

Applied to the contained configuration explained above, this principle leads to a configuration for a drop-dispensing device, as illustrated in FIGS. 3A-3D.

A liquid 30 to be dispensed is placed in a well 35 of this device (FIG. 3A). This well can be created in the top cover 36 of the device for example. The bottom part is similar to the structure of FIGS. 1A-1C.

A series of electrodes 31 is therefore used in order to draw (FIGS. 3B and 3C) and then to divide this liquid finger (FIG. 3D) as explained above with reference to FIGS. 2A-2D.

The drawback of this method is that the action cannot be reproduced reliably.

In fact during the formation of the finger, and when the latter is divided, the fluidic mechanisms are unfortunately very influenced by the pressure in the well 35. As the well empties, the pressure in the latter changes (the shape of the meniscus in the well can influence the capillary pressure, and the height of liquid can also alter the hydrostatic pressure) and the drops that are formed do not have a constant volume.

DISCLOSURE OF THE INVENTION

The invention, firstly concerns a liquid dispensing device, of the contained type that includes a first and a second substrate, the second substrate being equipped with an opening for the introduction of a fluid, and the first substrate being equipped with a multiplicity of electrodes, that includes:

- at least one electrode, called the transfer electrode, located at least partially opposite to the opening,
- at least two drop-forming electrodes,
- and at least one electrode, known as the reservoir electrode, located between the transfer electrode and the drop-forming electrodes, or associated with the transfer electrode and the drop-forming electrodes, and with an area that is at least equal to three times the area of each drop-forming electrode.

The device can also include at least one second reservoir electrode and at least one second transfer electrode located between two neighbouring reservoir electrodes, with at least two drop-forming electrodes being associated with each reservoir electrode.

According to a variant, the device can include also at least one second reservoir electrode, and at least one second transfer electrode located at least partially opposite to the opening and at least two drop-forming electrodes associated with the second reservoir electrode.

Preferably, at least one second reservoir electrode, or each reservoir electrode, has an area that is at least equal to three times the area of each drop-forming electrode of the drop-forming electrodes that are associated with it.

The invention therefore also concerns a liquid dispensing device, of the contained type, that includes a first and a second substrate, the second substrate being equipped with an opening for the introduction of a fluid, and the first substrate being equipped with a multiplicity of electrodes, including:

- an alternating set of electrodes known as transfer electrodes, at least one part of which is located at least partially opposite to the opening, and reservoir electrodes,
- a series of drop-forming electrodes, associated with each reservoir electrode, with at least one of the reservoir electrodes having an area that is at least equal to three times the area of each drop-forming electrode of the series of drop-forming electrodes associated with this reservoir electrode.

The invention also concerns a liquid dispensing device, of the contained type, that includes a first and a second substrate, the second substrate being equipped with an opening for the introduction of a fluid, the first substrate being equipped with a multiplicity of electrodes, including:

- a multiplicity of electrodes, known as transfer electrodes, at least one part of each transfer electrode being located at least partially opposite to the opening, and a multiplicity of reservoir electrodes, each reservoir electrode being associated with a transfer electrode,
- a series of drop-forming electrodes, associated with each reservoir electrode, with at least one of the reservoir electrodes having an area that is at least equal to three times the area of each drop-forming electrode of the series of drop-forming electrodes associated with this reservoir electrode.

It is therefore possible to create drop feeding systems according to the invention, that includes several reservoir electrodes, each being associated with a series of drop-forming electrodes, the reservoir electrodes being:

- placed in series from a liquid feed opening, and alternating with transfer electrodes,
- or placed in parallel around or from this opening, with each being supplied by a transfer electrode.

Preferably, at least one reservoir electrode has an area that is at least equal to three times or to 10 times or 20 times the area of each drop-forming electrode.

Advantageously, at least one reservoir is in the shape of a comb, whose teeth can be tapered on the side of the transfer electrode.

According to a variant, at least one reservoir electrode has the shape of a star.

A device according to the invention can include a containment wall between a reservoir electrode and the opening, or even a containment wall around at least one reservoir electrode.

One of the drop-forming electrodes advantageously has a rounded shape on one side and pointed on the other, thus favouring the drop ejection mechanism and minimising dependence in relation to the nature of the liquids and to the operating parameters of the device.

The first substrate can include conducting means, in order to form a counter-electrode.

This first substrate can also have a hydrophobic surface.

The second substrate can also have a hydrophobic surface, and possibly a dielectric layer under the hydrophobic surface.

The invention also concerns a process for the formation of a liquid reservoir, from a liquid well that includes:

- total or partial transfer of the liquid from the well to a so-called reservoir electrode, with the aid of an electrode called the transfer electrode located at least partially opposite to the well, with the pressure in the liquid reservoir being independent of the pressure of the liquid in the well.

The pressure in the liquid reservoir can be rendered independent of the pressure of the liquid in the well through de-activation of the transfer electrode after formation of the liquid volume.

The invention also concerns a liquid drop dispensing process that includes a process for the formation of a liquid reservoir as described above, and the formation of a drop of liquid by activation of at least n drop-forming electrodes (where $n \geqq 2$), and then de-activation of at least one of these electrodes from among the $n-1$ electrodes that are closest to the reservoir electrode, in order to pinch off a liquid finger.

The invention also concerns a liquid drop dispensing process using a device as described above, the formation of a liquid reservoir facing or above the reservoir electrode, or of at least two reservoir electrodes, and the ejection of a drop of liquid by activation of n drop-forming electrodes, (where $n \geqq 2$), and then de-activation of at least one of these electrodes from among the $n-1$ electrodes that are closest to the reservoir electrode for which a reservoir is formed.

DETAILED DISCLOSURE OF PARTICULAR EMBODIMENTS

Figure 1A:
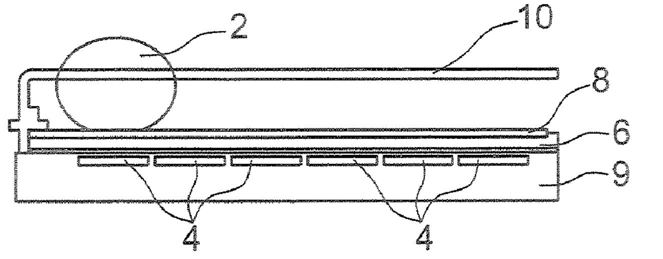
FIGS. 1A-1C illustrate the principle of drop manipulation by electro-wetting on an insulator.
Figure 1B:
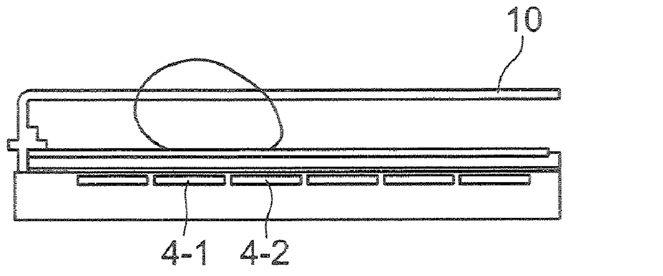
Figure 1C:
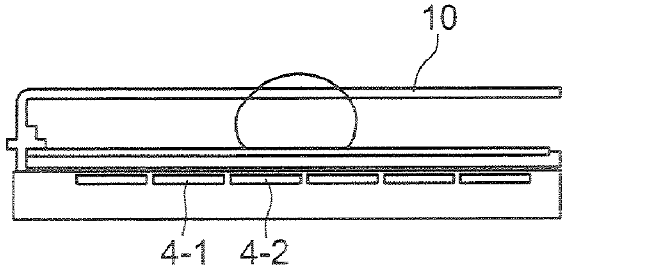
Figure 2A:
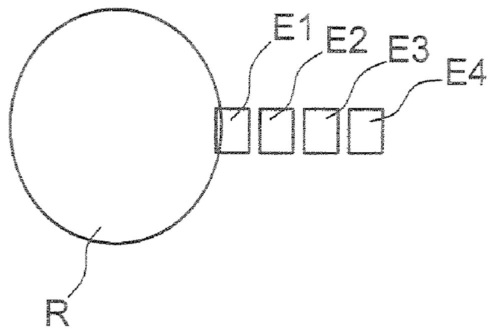
FIGS. 2A-2D represent stages of a known process to manufacture a drop on a line of electrodes.
Figure 2B:
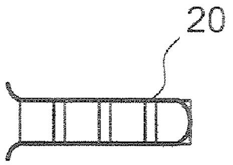
Figure 2C:
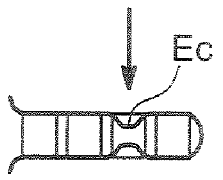
Figure 2D:
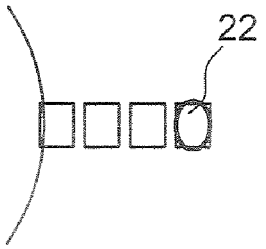
Figure 3A:
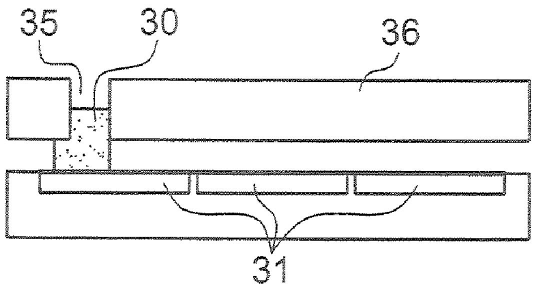
FIGS. 3A-3D represent a device of prior art.
Figure 3B:
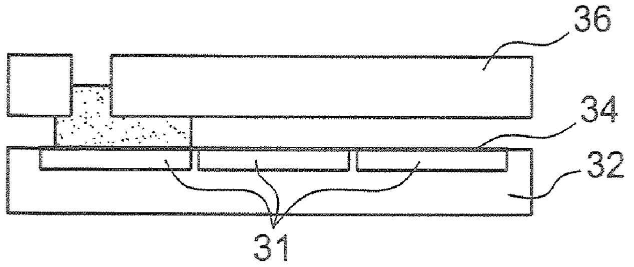
Figure 3C:
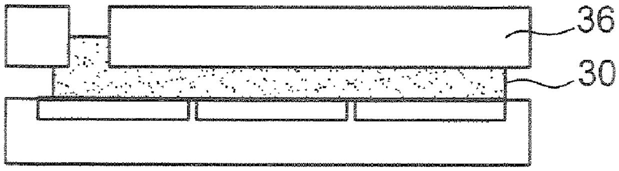
Figure 3D:
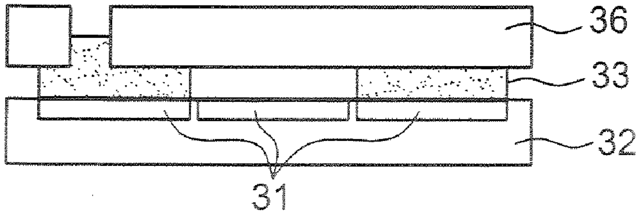
Figure 4A:
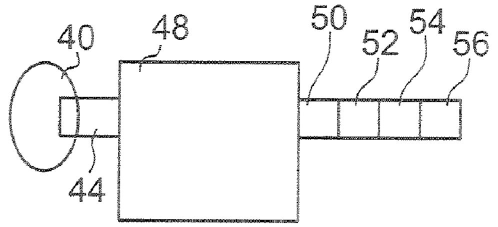
FIGS. 4A and 4B represent an example of the implementation of a device according to the invention.

A first embodiment of the invention is illustrated in FIGS. 4A and 4D, in a top view and a side view respectively.

FIG. 4A in fact represents only the system of electrodes implemented in a calibrated drop dispensing device according to the invention.

Figure 4B:
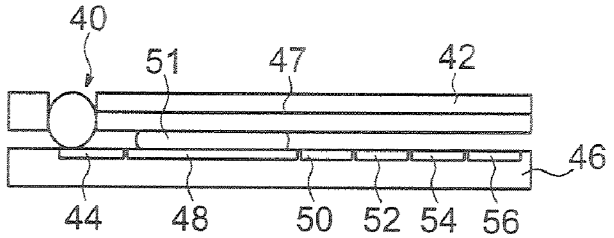

Furthest to the left, this figure firstly shows a well 40, which is in fact created in the cover area 42 of the device (see FIG. 4B).

This well is placed at least partially in front of a transfer electrode 44, which is in fact formed in the substrate 46 of the device.

Following on from this transfer electrode is a reservoir electrode 48, which will be used to form a liquid retention micro-reservoir.

Then come drop-forming electrodes, with four formation electrodes 50, 52, 54, 56 being represented in FIGS. 4A and 4B.

A counter-electrode 47 is placed in the cover area 42.

Figure 8A:
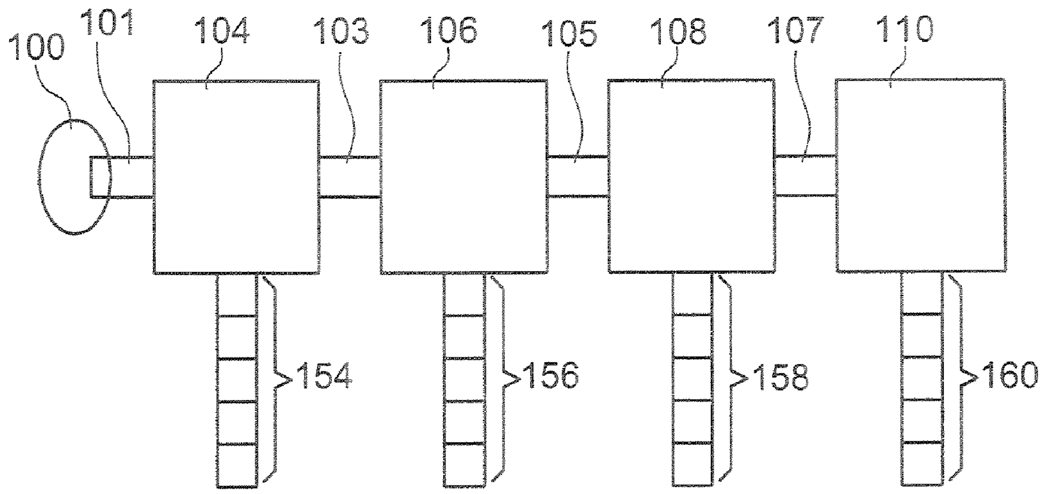
Figure 8B:
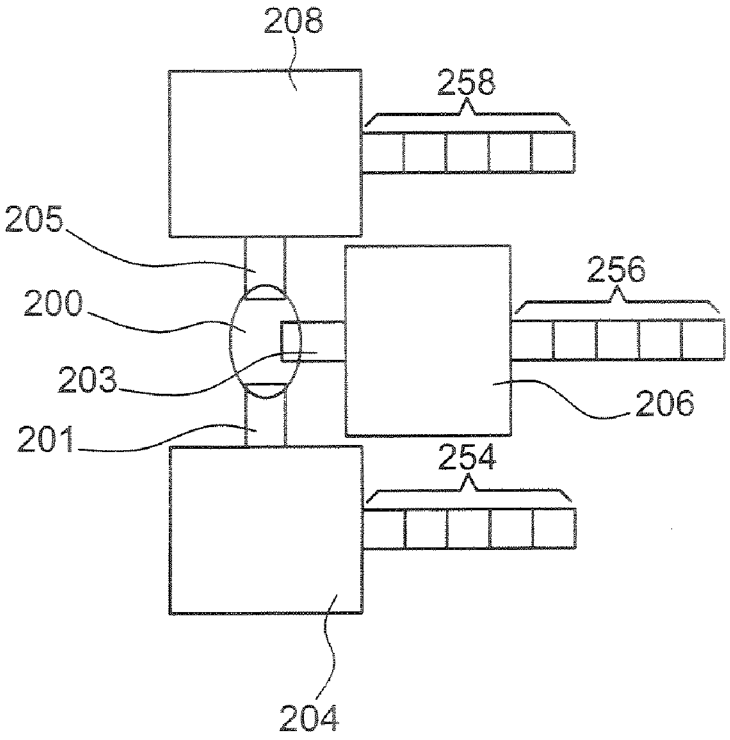

The invention therefore proposes the organisation of a series of electrodes in a drop dispensing device, these electrodes having different functions, a series of drop-forming electrodes, and a transfer electrode associated with each reservoir electrode. In FIG. 4A and those that follow, the reservoir electrode is located between the transfer electrode and the drop-forming electrodes, though other configurations are possible, as illustrated in FIGS. 8A and 8B.

The first electrode 44, called a transfer electrode, can be used to pump the liquid from the reservoir and to bring it to the vicinity of the second electrode 48, known as the reservoir electrode.

On this reservoir electrode a certain quantity of liquid can be accumulated. This is represented as having a square or rectangular shape in FIG. 4A, but it can be any shape. Preferably, it can accumulate at least three to four times the drop volume to be dispensed, and preferably at least 10 times or 20 times the volume of each drop dispensed.

Since the distance between the two substrates 42, 46 is substantially constant (as can be seen in FIG. 4B) it is in fact the area of the electrode 48 that is at least three to four times, or at least ten or twenty times the area of each of the drop-forming electrodes 50, 52, 54, 56.

When it is activated, the transfer electrode can be used to move a quantity of liquid, located in the well 40, to the vicinity of the reservoir electrode 48.

When the latter is also activated, the liquid is transferred onto the surface of the device located above the reservoir electrode 48.

If one wishes to continue to supply the area located above the reservoir 48, it is possible to re-activate electrode 44, and then electrode 48, so as to continue to accumulate liquid in this reservoir area.

It is thus possible to accumulate a large volume of liquid 51 (FIG. 4B) inside the device. A large advantage of this is that the pressure in this volume of liquid accumulated above the electrode 48 is independent of the pressure of the liquid in the well 40 through de-activation of the transfer electrode 44.

Thus, the drops that can then be formed using electrodes 50-56 will themselves be independent of the pressure of the liquid in the well 40.

As long as the transfer electrode 44 is not activated, the liquid formed by the reservoir electrode 48 is not in contact with the well 40. The drop ejection or dispensing that can then be effected from the liquid stored above the electrode 48 can therefore be performed in a calibrated manner, while still using a well 40, and independently of the pressure in the latter, in order to fill the microfluidic component concerned.

The following is an example of the procedure.

The user fills the well 40 with the liquid to be dispensed into the microfluidic component.

Electrical control of the different electrodes is then assigned to an automatic electrical control system or a computer, which operates the relays associated with each of the electrodes.

The different sequences can be as follows:

1—All the electrodes are at rest (state 0),

2—The transfer electrode 44 is set to state 1, and the liquid in the well is moved to the vicinity of the reservoir electrode 48, 3—The reservoir electrode 48 is set to state 1, and the liquid fills the space above the reservoir electrode 48, 4—The transfer electrode 44 is reset to state 0. A large drop has then been formed 51 (FIG. 4B) at the reservoir electrode, and this drop is no longer in physical contact with the well.

5—For each new drop to be formed, it is possible to:

5.1—De-activate the reservoir electrode 48, 5.2—Activate (at least) two dispensing electrodes 50-56, 5.3—De-activate at least one of the dispensing electrodes 50-56 (if there are only two electrodes, then electrode 50 is de-activated) and activate electrodes 48 and 52, in order to pinch off the liquid finger. Generally speaking, one de-activates one of the dispensing electrodes other than that which is most distant from the reservoir 51.

5.4—Activate the reservoir electrode 48 in order to favour the dividing action. This results in the formation and ejection of the new drop.

By repeating stage 5, a series of drops can thus be formed.

When the reservoir electrode is empty, or is no longer sufficiently filled, a new cycle can be started (stages 1 to 5) to re-pump the liquid into the well 40 and then move it to the reservoir electrode by means of the transfer electrode 44, and so on.

The device includes at least two formation electrodes, though other electrodes can be provided for the manipulation of drops in the microsystem (electrodes 54, 56 dotted in FIG. 4A).

The volume of the well is determined by its diameter (or section) and by its height. In particular the height of the well can be of the order of one millimetre or up to a few millimetres—between 1 mm and 10 mm for example. Thus the volume of liquid stored in the well can be large, but of minimum dimensions (in terms of chip area). Thus it is possible to dispense a large number of drops while also minimising the area of the electrodes, and the reservoir electrode 48 in particular. For example, it is possible to dispense drops of a few tens of nanolitres from a reservoir with a capacity of microlitres.

Figure 5A:
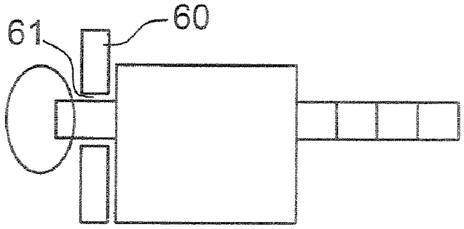
FIGS. 5A-5B are examples of variants of a device according to the invention.

According to a variant illustrated in FIG. 5A, it is possible to add containment means, in the form of walls 60 for example, for better containment of the liquids. The spacer can be a thick layer of resin whose shape can be structured, by using a layer of photosensitive resin for example (SU8, ordyl, etc.) and determining the patterns by photolithography. Thus it is possible to form walls around some of the electrodes. In particular, a wall with an opening 61 is created between the reservoir electrode 48 and the well 40.

This first pattern can be used to ensure that the liquid in the reservoir electrode 48 does not back up to the well 40, which can arise by capillary action. The shrinking effect acts as a barrier as long as the surfaces are non-wetting, that is as long as there is no activation by the electrodes. The surfaces of the walls 60 are preferably rendered hydrophobic.

Figure 5B:
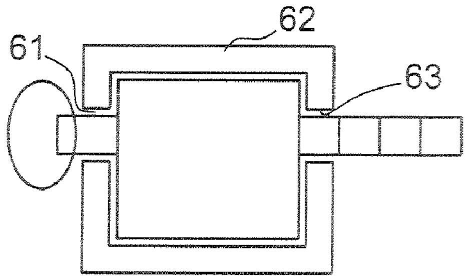

As illustrated in FIG. 5B, it is also possible to contain all of the reservoir electrode 48 by means of containment means, again in the form of walls 62, leaving just an inlet opening 61 and an outlet opening 63. This can be used to always keep liquid in the reservoir 48 even if the reservoir electrode is not at state 1, and to limit the risk of contamination between different adjacent reservoirs.

These walls or these containment means 60, 62 are seen from above in FIGS. 5A and 5B, but are located between the two substrates 42, 46 of the device.

According to another variant, it is possible to optimise the shape of the reservoir electrode 48 in order to flatten or attract the liquid constantly against the drop-forming electrodes 50-56 and to always ensure the start-up of the formation process of the liquid finger during the drop dispensing procedure.

Figure 6A:
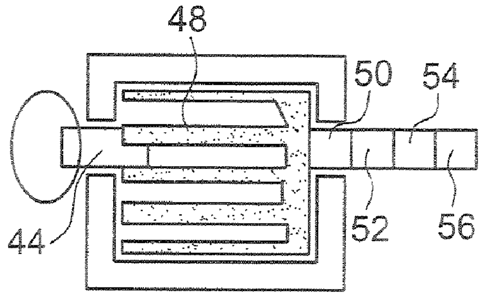
FIGS. 6A-6B are examples of other variants of a device according to the invention, FIGS. 7A-7C again illustrate another example of variants of a device according to the invention, FIGS. 8A and 8B again illustrate one of the other examples of application of a device according to the invention.
Figure 6B:
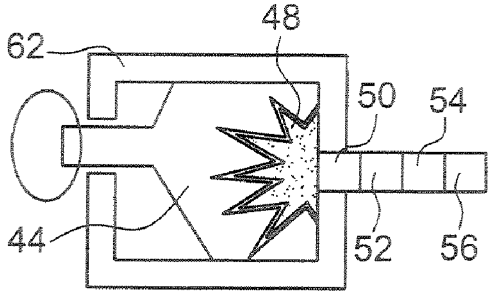
Figure 9A:
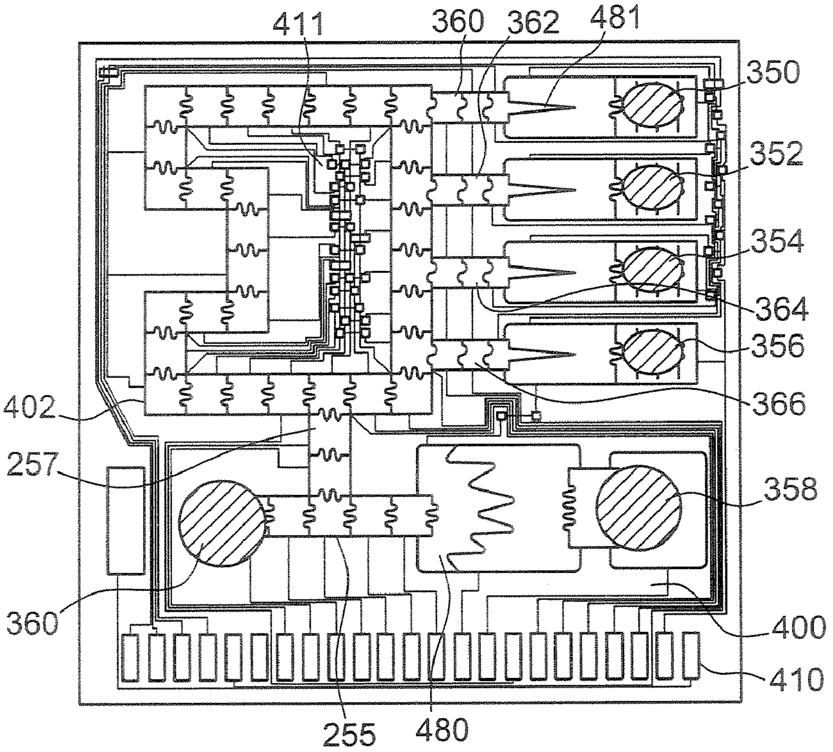
FIGS. 9A and 9B represent two structures of devices according to the invention.
Figure 9B:
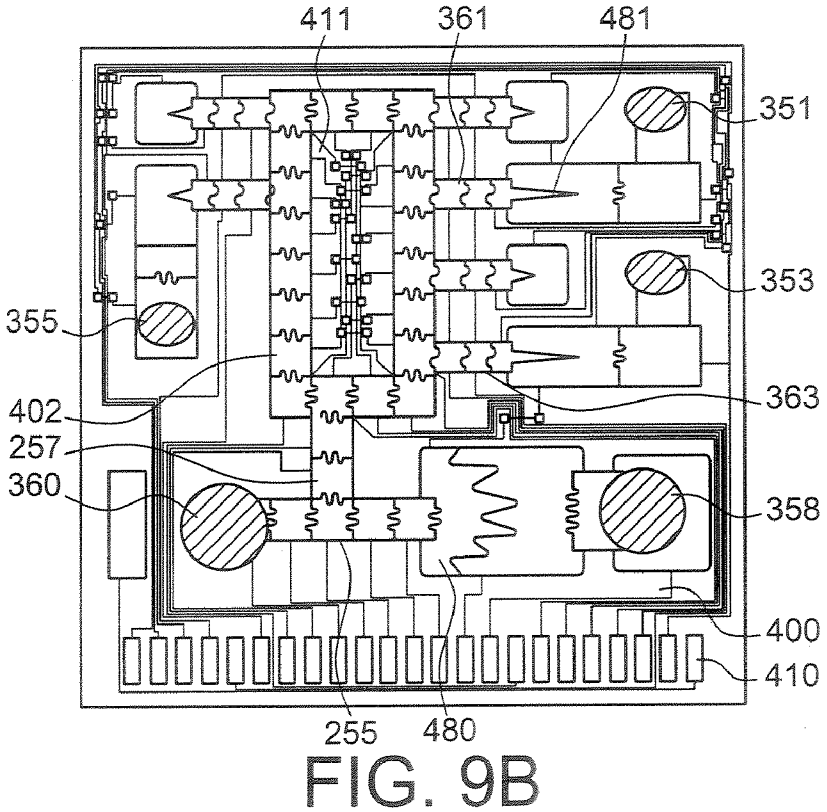

As illustrated in FIGS. 6A and 6B, it is possible, for example, to use an electrode 48 in the form of a comb or a half star in order to guarantee an electrode surface gradient. As illustrated in FIGS. 9A and 9B, it is also possible to use an electrode 481 with a pointed shape. In fact, electro-wetting on an insulator has the effect of spreading the liquid at the activated electrodes, resulting here in a liquid position that allows the area to be maximised in respect of the electrode. This results in an effect of "gathering" the liquid in the vicinity of the first drop formation electrode 50.

This improvement can also be used to completely empty the reservoir.

It should be noted that the fingers of the comb (FIG. 6A) or the half-star (FIG. 6B) or the point (FIGS. 9A, 9B) can be square or pointed.

In these various cases, the transfer electrode 44 has a shape that is designed to move the liquid to the reservoir electrode 48.

This variant is presented in FIGS. 6A and 6B, with the containment means 62 forming a cavity, but can be implemented without these means, or simply with the wall 60 of FIG. 5A.

Figure 7A:
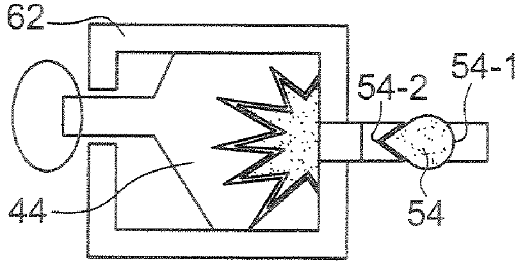
Figure 7B:
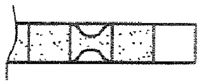
Figure 7C:
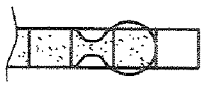

According to yet another variant, which can be combined with either of the preceding variants, it is also possible to improve the reproducibility of the drop volume by optimising the shape of the drop-forming electrodes 50-56, as illustrated in FIGS. 7A-7C.

During the division stage (FIG. 7A) the finger is divided in order to form a new drop. At the moment of the division, the future drop has a pointed shape on one side, and is mostly spherical or angular on the other (FIG. 7B). The spherical or angular shape is explained by the competition between the capillary forces and the electro-wetting effect on a square electrode. Finally, the volume of the drop depends a lot on the values of the surface tension and on the value of the voltage applied to the electrodes.

Secondly, during the division, the drop takes on the shape of a swan neck.

This swan-neck geometry can also depend on a certain number of parameters such as the surface tension, the values of the voltage applied to the electrodes, and on the geometry of the division electrode.

This results in a dependence of the drop volume on the nature of the liquids and to the operating parameters of the chip.

In order to remedy this problem, it is possible to create a drop formation electrode with a shape that limits the angular effects on one side, and by controlling the shape of the swan neck. This is achieved by creating an electrode, like electrode 54 for example, in the shape of a drop. This is round on one side 54-1 and pointed on the other side 54-2, as illustrated in FIG. 7A.

Another application example is illustrated in FIGS. 8A and 8B, schematically in a view from above. On these figures, as in FIGS. 4A-7A, the top substrate, forming the containment and in which the well is formed, is not shown. Only the distribution of the transfer electrodes, the reservoir electrodes and the drop-forming electrodes is represented.

In FIG. 8A, a well 100 feeds several reservoir electrodes 104, 106, 108, 110 according to the invention, by means of transfer electrodes 101, 103, 105, 107. At the output of each reservoir electrode are placed drop-forming electrodes, globally labelled by the references 154, 156, 158, and 160. Each series of formation electrodes is associated with a reservoir electrode. In this example, the reservoirs 104, 106, 108, 110 are arranged in series from the well, and the drops are formed in parallel from each reservoir.

In FIG. 8B, a well 200 feeds several reservoir electrodes 204, 206, 208 according to the invention, in parallel by means of transfer electrodes 201, 203, 205. At the output of each reservoir electrode are placed drop-forming electrodes globally labelled by the references 254, 256, and 258. Here again, each series of formation electrodes is associated with a reservoir electrode. In this example, the reservoirs 204, 206, 208 are arranged in parallel in relation to the well, and the drops are formed in parallel from each reservoir.

Here again, electrical control of the different electrodes can be performed by an automatic electrical control system or a computer, which operates the relays associated with each of the electrodes.

These methods of implementation in FIGS. 8A and 8B can be combined with the one or more of the methods of implementation in FIGS. 5A-7C. One or more of the reservoir electrodes can be fitted with containment means, as in FIGS. 5A and 5B, and/or have a shape as illustrated in FIGS. 6A-6B, while one or more of the drop-forming electrodes can have a shape as illustrated in FIG. 7A.

In either substrate, the buried electrodes are obtained by deposition, and then engraving of a fine layer of a metal chosen from among Au, Al, Ito, Pt, Cu, Cr, or others, by means of the conventional micro-technologies employed in microelectronics. The thickness of the electrodes is a few tens of nanometres to a few micrometres, and can be between 10 nm and 1 μm for example. The width of the pattern is from a few μm to a few mm (flat electrodes) for electrodes 50-56 and the transfer electrode 44.

The two substrates 42, 46 are typically separated by a distance of between 10 μm and 100 μm or 500 μm, for example.

Whatever the embodiment concerned, an ejected drop of liquid 22 will have a volume of between a few picolitres and a few microlitres for example, and between 1 pl or 10 pl and 5 μl or 10 μl, for example.

In addition, each of the electrodes 50-56, 150, 152, 154, 250, 252, 254, has an area, for example, of the order of a few tens of $\mu m^2$ (10 $\mu m^2$ for example up to 1 $mm^2$), according to the size of the drops to be transported, with the spacing between neighbouring electrodes being between 1 μm and 10 μm for example.

Electrode structuring can be achieved by conventional micro-technological methods, such as photolithography. The electrodes are created, for example, by depositing a metallic layer (Au, Al, ITO, Pt, Cr, Cu, etc.) by photolithography.

The substrate is then covered with a dielectric layer in $Si_3N_4$, $SiO_2$, etc. Finally, a hydrophobic layer is deposited, such as a deposition of Teflon by a spin-coating technique for example.

Methods for the creation of chips incorporating a device according to the invention can be directly derived from the processes described in document FR-2 841 063.

Conductors, and in particular the buried catenaries, can be created by the deposition of a conducting layer and etching of this layer in a pattern that is appropriate for conductors, before deposition of the hydrophobic layer.

This will be the case for the top cover 42 in particular, in which a counter-electrode can be created.

Each of the different electrodes is connected to a mean forming relays that raise it to a potential that is determined by a voltage source. The whole is controlled by an automatic electrical control system or a computer.

Examples of chip structures according to the invention are provided in FIGS. 9A and 9B.

According to one implementation example, the chips measure 13 mm by 13 mm, and the drop displacing electrodes measure 800 μm by 800 μm.

The hatched disks 350, 352, 354, 356, 358 (FIG. 9A), and 351, 353, 355 (FIG. 9B) represent the location of the holes in the cover (the wells). Disk 360 represents a waste disposal area.

In the bottom part of the chip, there is a main reservoir 400 in accordance with the invention, opening onto a first line of electrodes 255, whose left-hand end opens onto the waste disposal area 360. Via this line, drops of liquid can be taken and transported by electro-wetting from the main reservoir 400.

Thus it is possible to purge the reservoir 400 easily, by emptying it totally and directly into the waste disposal 360. The drops formed from the reservoir 400 can also be sent to the loop 402 in which they can be moved by electro-wetting. Around this loop, there is a collection of secondary reservoirs 350, 352, 354, 356 (FIG. 9A) or 351, 353, 355 (FIG. 9B) arranged in parallel.

FIGS. 9A and 9B are two chip structures showing different shapes and arrangements of the reservoirs 350, 352, 354, 356, 351, 353, 355. Thus the chip in FIG. 9A has four secondary reservoirs 350, 352, 354, 356 open to the outside per well. The chip in FIG. 9B includes three secondary reservoirs 351, 353, 355 open to the outside per well.

With each reservoir is associated a set of electrodes 360, 362, 364, 366, 361, 363 which are used to bring one or more drops from the reservoir corresponding to path 402. Likewise, section 257, also formed from electrodes, can be used to connect path 255 and loop 402.

References 410, 411 indicate addressing areas or pads of the electrodes that constitute paths 255 and 402, and electrodes located at the output of the various reservoirs. These areas or pads can themselves be controlled by electronic means or computers.

The reservoirs are configured and used in accordance with the invention. They include a series of electrodes that are used to contain a volume of liquid at a reservoir electrode, from a well, in order to allow the reproducible dispensing of drops. In addition, the reservoirs include containment means 480, 481—reservoir electrodes) in star or point form, arranged, in accordance with the invention, downstream of the transfer electrodes from the reservoir.

These structures are used to dispense drops of aqueous solution with a high degree of precision in terms of liquid volume.

CVs (Cv=2×standard-deviation/mean×100) of less than 3% are measured.

A drop dispensing process according to the invention can employ a device as described with reference to FIGS. 9A and 9B.

It is possible to produce a drop from the main reservoir 400, and to move it along path 402, on which it will be mixed with one or more drops from one or more reservoirs 350, 352, 354, 356 (FIG. 9A) or 351, 353, 355 (FIG. 9B).

The invention claimed is:

1. A liquid dispensing device comprising:

first and second substrates, wherein the first substrate includes an opening for introduction of a fluid, and the second substrate includes a multiplicity of electrodes that include:

at least one transfer electrode, located at least partially opposite to the opening, at least two drop-forming electrodes, and at least one reservoir electrode, associated with the transfer electrode and with the drop-forming electrodes, and with an area that is at least equal to three times an area of each drop-forming electrode, wherein the reservoir electrode can be activated without activation of the transfer electrode, and vice versa.

2. A device according to claim 1, further comprising at least one second reservoir electrode, and at least one second transfer electrode located between, or associated with, two neighbouring reservoir electrodes, with at least two drop forming electrodes being associated with each reservoir electrode.

3. A device according to claim 2, wherein the at least one second reservoir electrode includes an area that is at least equal to three times the area of each drop-forming electrode of the drop-forming electrodes that are associated with it.

4. A device according to claim 1, further comprising at least one second reservoir electrode, and at least one second transfer electrode located at least partially opposite to the opening and at least drop-forming electrodes that are associated with the second reservoir electrode.

5. A device according to claim 4, wherein the at least one second reservoir electrode includes an area that is at least equal to three times the area of each drop-forming electrode of the drop-forming electrodes that are associated with it.

6. A device according to claim 1, wherein the at least one reservoir electrode includes an area that is at least equal to ten times the area of each drop-forming electrode of the drop-forming electrodes that are associated with it.

7. A device according to claim 1, wherein the at least one reservoir electrode includes a comb or pointed shape.

8. A device according to claim 7, wherein the comb includes tapered teeth on a side of the transfer electrode, or a point being tapered on the side of the transfer electrode.

9. A device according to claim 1, wherein the at least one reservoir electrode is star shaped.

10. A device according to claim 1, further comprising a containment wall between the at least one reservoir electrode and the opening.

11. A device according to claim 1, further comprising at least one containment wall around the at least one reservoir electrode.

12. A device according to claim 1, wherein at least one of the at least two drop-forming electrodes includes a rounded shape on one side and pointed shape on another side.

13. A device according to claim 1, wherein the first substrate includes means for conducting.

14. A device according to claim 1, wherein the first substrate includes a hydrophobic surface.

15. A device according to claim 1, wherein the second substrate includes a hydrophobic surface.

16. A device according to claim 15, wherein the second substrate includes a dielectric layer under the hydrophobic surface.

17. A liquid dispensing device comprising:

first and second substrates, wherein the first substrate includes an opening for introduction of a fluid, and the second substrate includes a multiplicity of electrodes that include:

at least one transfer electrode located at least partially opposite to the opening, at least two drop-forming electrodes, and at least one reservoir electrode, associated with the transfer electrode and with the drop-forming electrodes, and with an area that is at least equal to three times an area of each drop-forming electrode, wherein the reservoir electrode can be activated without activation of the transfer electrode, and vice versa; and means for moving drops by electro-wetting, the means forming a loop.

18. A device according to claim 17, further comprising one or more secondary reservoirs arranged around the loop.

19. A device according to claim 18, wherein each secondary reservoir is connected to the loop by the at least one transfer electrode.

20. A liquid drop dispensing process that uses a device that includes, first and second substrates, wherein the first substrate includes an opening for introduction of a fluid, and the second substrate includes a multiplicity of electrodes that include at least one transfer electrode, located at least partially opposite to the opening, a plurality of drop-forming electrodes, and at least one reservoir electrode, associated with the transfer electrode and with the drop-forming electrodes, and with an area that is at least equal to three times an area of each drop-forming electrode, wherein the reservoir electrode can be activated without activation of the transfer electrode, and vice versa, wherein the method comprises:

forming a liquid reservoir opposite to the at least one reservoir electrode;

ejecting a drop of liquid by activation of n of the drop-forming electrodes, wherein $n>2$; and then de-activating at least one of the electrodes from among the $n-1$ electrodes that are closest to the at least one reservoir electrode.

21. A liquid drop dispensing process comprising:

using a device to dispense a drop, said device including first and second substrates, wherein the first substrate includes an opening for introduction of a fluid, and the second substrate includes a multiplicity of electrodes that include at least one transfer electrode located at least partially opposite to the opening, at least two drop-forming electrodes, and at least one reservoir electrode, associated with the transfer electrode and with the drop-forming electrodes, and with an area that is at least equal to three times an area of each drop-forming electrode, wherein the reservoir electrode can be activated without activation of the transfer electrode, and vice versa; and means for moving drops by electro-wetting, the means forming a loop.

22. A process according to claim 21, further comprising transporting a formed drop along a trajectory in a shape of the loop.

23. A process according to claim 22, further comprising mixing the formed drop with one or more drops from reservoirs arranged around the loop.

* * * * *